United States Patent [19]

Perkins et al.

[11] 4,252,768
[45] Feb. 24, 1981

[54] SANDBLASTING NOZZLE

[75] Inventors: Gerald S. Perkins, Altadena; Eugene V. Pawlik, LaCanada; Wayne M. Phillips, La Crescenta, all of Calif.

[73] Assignee: The United States of America as represented by the Administrator of the National Aeronautics and Space Administration, Washington, D.C.

[21] Appl. No.: 658,487

[22] Filed: Feb. 17, 1976

[51] Int. Cl.³ .............................................. C04B 35/52
[52] U.S. Cl. .................................... 264/332; 106/43
[58] Field of Search .................. 264/65, 81, 221, 332, 264/DIG. 44; 106/43

[56] References Cited
U.S. PATENT DOCUMENTS

| | | | |
|---|---|---|---|
| 3,367,826 | 2/1968 | Heestand et al. | 264/81 |
| 3,455,682 | 7/1969 | Barbaras et al. | 264/332 |
| 3,886,254 | 5/1975 | Tanoka et al. | 264/65 |
| 3,903,230 | 9/1975 | Kamigaito et al. | 264/65 |
| 3,907,949 | 9/1975 | Carlson | 264/65 |
| 3,950,464 | 4/1976 | Masaki | 264/65 |
| 3,996,329 | 12/1976 | Holland et al. | 264/328 |

Primary Examiner—John Parrish
Attorney, Agent, or Firm—Monte F. Mott; John R. Manning

[57] ABSTRACT

An improved nozzle for use with abrasive and/or corrosive materials is formed of sintered ceramic compositions having high temperature oxidation resistance, high hardness and high abrasion and corrosion resistance. The ceramic may be a binary solid solution of a ceramic oxide and silicon nitride, and preferably a ternary solid solution of a ceramic oxide, silicon nitride and aluminum nitride. The ceramic oxide is selected from a group consisting of $Al_2O_3$, $Y_2O_3$ and $Cr_2O_3$, or mixtures thereof. Titanium carbide particles are dispersed in the ceramic mixture before sintering. The nozzles are encased for protection from external forces while in use by a metal or plastic casing.

7 Claims, 5 Drawing Figures

4,252,768

SANDBLASTING NOZZLE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to improved nozzles for use with abrasive and/or corrosive materials, and more particularly to nozzles of reduced wear rate and cost for use in industry anywhere there is an abrasive and/or corrosive material to be discharged through a nozzle.

Many industrial processes require discharging an abrasive and/or corrosive fluid under pressure through a nozzle. The wear rate of the nozzle is often so high that the current practice is to employ silicon or tungsten carbide (which are among the hardest known substances) for the nozzles, and to periodically replace the nozzles. For example, heavy duty sandblasting nozzles are presently made of tungsten carbide with steel casings. Such nozzles cost about $100 and have a limited life of about 200 hours. Wear of the nozzle results in gradual reduction of sandblasting effectiveness in that as the orifice increases in size, the velocity of the air and sand decreases. At the same time the area covered by the nozzle spray expands. To maintain operator effectiveness, frequent replacement of the nozzle is required.

Assuming several million sandblast nozzles are consumed annually in just the United States, an improvement which extends the life of the nozzle and reduces their unit cost would result in a direct saving to the industry of millions of dollars in just the nozzles alone. Additional savings would be realized from higher lifetime effectiveness (i.e., greater operator productivity) and a significant reduction in lost time involved in replacement of nozzles.

Another example is paint spraying. Because metal oxides are abrasive, and paints are generally mixtures of metal oxides in a liquid vehicle, paint spray guns are made with replaceable silicon carbide tips (nozzles). As the tip wears, there is a degradation of the spraying process and loss of operator effectiveness. This requires more skill on the part of the operator, or more frequent replacements. Since each replacement involves loss of productive time, there is a net loss in production due to wear even with more frequent replacements.

Still another example is oil drilling in which the drill bit is continually washed with drilling mud in the drilling process. As the nozzle for the drilling mud wears, the effectiveness of the washing process decreases. In order to maintain high effectiveness, and thereby minimize wear of the drill bits themselves, it is necessary to replace the drilling mud nozzle frequently, but that involves loss of drilling time.

There are still other examples that could be enumerated that involve abrasive and/or corrosive wear, such as steam nozzles. The few that have been enumerated are not intended to be all inclusive. Consequently, although the following description of specific embodiments will be with reference to some of these examples, it is understood that such examples are not intended to be limitative of the invention.

SUMMARY OF THE INVENTION

In accordance with the present invention, an improved low-cost nozzle for abrasive and/or corrosive material is comprised of a shaped nozzle of a high temperature oxidation resistant, high hardness and high abrasion and corrosion resistant ceramic composition, the latter comprising a sintered body of particles of a high temperature, corrosion and abrasion resistant metal carbide, preferably titanium carbide, added to and dispersed in a matrix of a ceramic oxide and silicon nitride, and particularly a matrix of a mixture of aluminum oxide, silicon nitride and aluminum nitride. The ceramic material used to form the nozzle in accordance with the invention has high resistance to temperature oxidation, resistance to thermal shock and resistance to abrasion. The nozzle is formed by sintering powdered material under pressure in a graphite mold of the shape desired, and then sometimes at least partially encasing the nozzle in metal or plastic shaped to adapt the nozzle to the particular application. The nozzle and casing may be fabricated separately and assembled for use, but the casing is preferably cast or molded around the nozzle.

DESCRIPTION OF THE PREFERRED EMBODIMENTS

Figure 1:
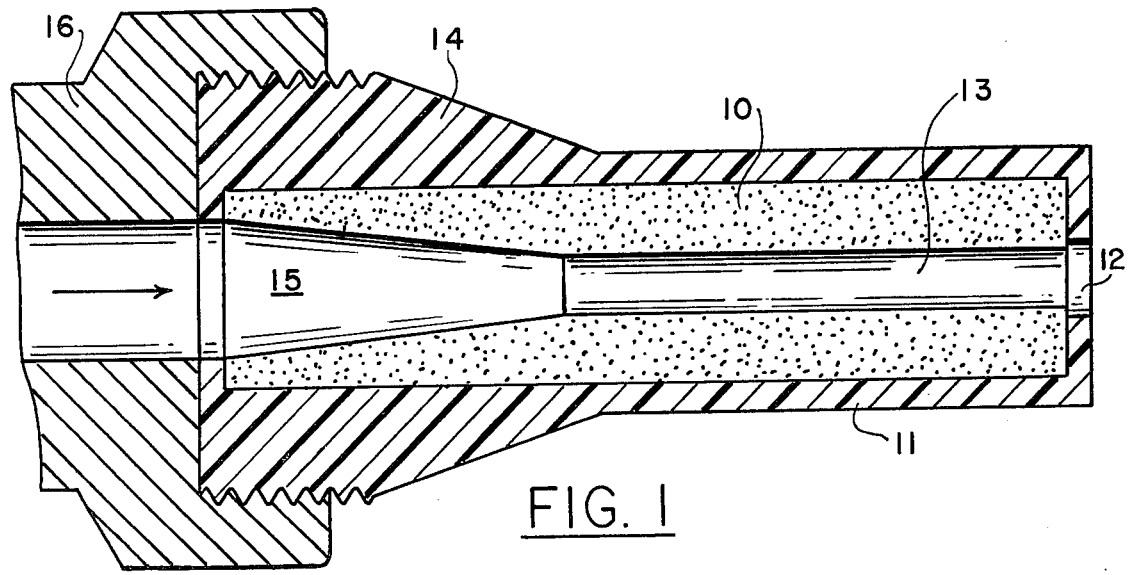
FIG. 1 illustrates an exemplary nozzle made according to the invention for sandblasting applications.

Referring to FIG. 1 of the drawings, an improved low-cost sandblasting nozzle is shown comprising a ceramic core 10 (hereinafter called "the nozzle") and a plastic or metal casing 11 having an orifice 12 of greater diameter than the internal diameter of the exit end 13 of the nozzle. The casing has a thickened portion 14 over the inlet end 15 of the nozzle to not only accommodate threads for screwing the casing into an internally threaded metal coupling 16, but also to strengthen the inlet end of the nozzle shaped as shown to provide a funnel-like inlet for compressed air and sand.

The internal diameter of the nozzle at the exit end is made as small as the smallest internal diameter of the entire nozzle for maximum concentration of the stream of air and sand. For some applications, the exit end may be flared by progressively increasing the internal diameter over the last half or third of the passage through it. In that case, the orifice 12 of the casing is made even larger so that exiting sand will not come in contact with the casing.

Although the casing may be made of metal, as noted above, it is preferably made of plastic, as shown, not only because of its low cost and shipping weight, but also because the plastic interface between the casing and the metal coupling at the inlet serves to provide an air-tight seal. If the casing were made of metal, it would likely not be extended over the face of the inlet end, as shown. Instead, that annular portion over the face of the inlet end of the nozzle shown in FIG. 1 would be provided as a separate plastic or rubber washer. In either case, the nozzle assembly can be easily changed, but it would be easier to have the washer formed as part of the protective casing. On the other hand, if the casing is made of metal, it could be molded separately, as by investment casting. Then only the nozzle itself would be replaced, each time by simply inserting a new nozzle into the casing.

Figure 2:
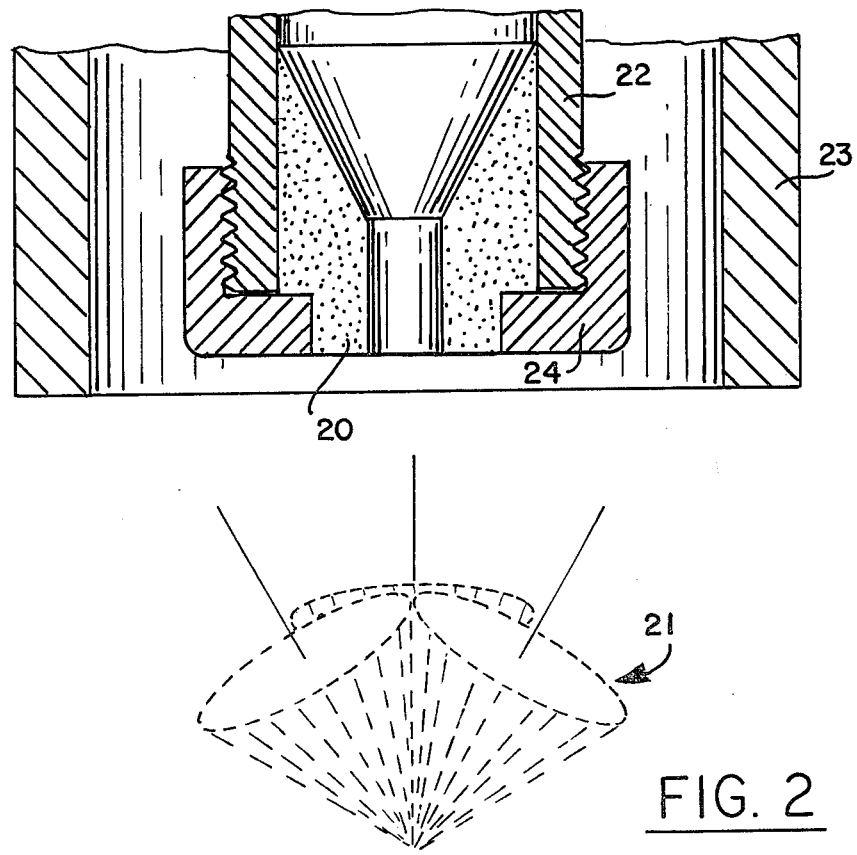
FIG. 2 illustrates an exemplary nozzle made according to the invention for oil drilling applications.

In some applications there may not be a specific requirement for a protective casing, such as in the case of a drilling-mud nozzle 20 shown in FIG. 2 for an oil drilling bit 21 comprised of three conical pinions (shown in dotted lines), each rotated on its own axis. Drilling mud is fed under pressure to the nozzle by a casing 22. The mud is directed by the nozzle to the center of the pinions to continually wash and lubricate them. Excess drilling mud carries material being drilled by the bit 21 to the surface through an outer casing 23. The nozzle is molded out of ceramic material according to the present invention and delivered to the drilling site without a casing. At the site, a retainer 24 on end of the casing 22 is unscrewed to replace the nozzle.

A ceramic composition is used to form the nozzles in accordance with the present invention, particularly a ceramic composition having high temperature oxidation resistance, high strength and abrasion resistance, as well as resistance to thermal shock, and comprising a solid solution of certain ceramic oxides, particularly aluminum oxide ($Al_2O_3$), silicon nitride ($Si_3N_4$) and aluminum nitride (AlN). After sintering, these combined materials form a very stable solid solution.

As a particular feature of the invention, it has been found that such a ceramic composition, when combined with an abrasion resistant metal carbide, particularly titanium carbide, results in the production of a highly valuable ceramic nozzle. The ceramic nozzle has high oxidation resistance, good abrasion and wear resistance, low coefficient of friction and high hardness equivalent to and superior to tungsten carbide. Thus, the ceramic nozzles formed of the two or three component single-phase solid solution of aluminum oxide, silicon nitride and aluminum nitride, are particularly advantageous. In other words, the ceramic compositions employed in producing the improved nozzles according to the invention are multi-component, single-phase solid solutions consisting of certain ceramic oxides, particularly aluminum oxide, and silicon nitride, and especially three-component single phase solid solutions of such ceramic oxides, particularly aluminum oxide, silicon nitride and aluminum nitride. When particles of titanium carbide are dispersed in the ceramic, the silicon nitride cannot react with the metal (titanium) to form a silicide, so that the resulting ceramic retains its structural integrity. Further, the solid solution retains the crystal structure of the silicon nitride so that the ceramic has very high abrasion resistance, good strength at high temperatures as well as resistance to thermal shock and oxidation. The titanium carbide enhances the high abrasion resistance when it is included in the composition.

The ceramic oxide component can be any of the oxides, also known as sesquioxides, of the group consisting of aluminum oxide ($Al_2O_3$), yttrium oxide ($Y_2O_3$), and chromium oxide ($Cr_2O_3$), employed separately or in combination, but the preferred ceramic oxide for producing the solid phase ceramic compositions employed in producing nozzles according to the invention is aluminum oxide. However, mixtures of such ceramic oxides, particularly aluminum oxide together with yttrium oxide and/or chromium oxide, can be employed. Particularly preferred combinations are those of aluminum oxide and yttrium oxide, preferably in proportions of about 1 to about 10% yttrium oxide and about 90 to about 99% aluminum oxide, by weight. Similar combinations of aluminum oxide and chromium oxide in amounts for example of about 1 to about 10% of chromium oxide and about 90 to about 99% of aluminum oxide, by weight, can also be employed.

The ceramic solid solutions employed are preferably comprised of certain molar proportions of the above noted ceramic oxide and silicon nitride for production of the two-component solid solution, and also of certain molar proportions of the above ceramic oxide, silicon nitride and aluminum nitride for producing the novel three-component solid solutions as described in a co-pending U.S. application Ser. No. 663,876 filed Nov. 20, 1975, now U.S. Pat. No. 4,072,532, by Wayne M. Phillips from which some of the following description referring to FIG. 3 is taken.

Figure 3:
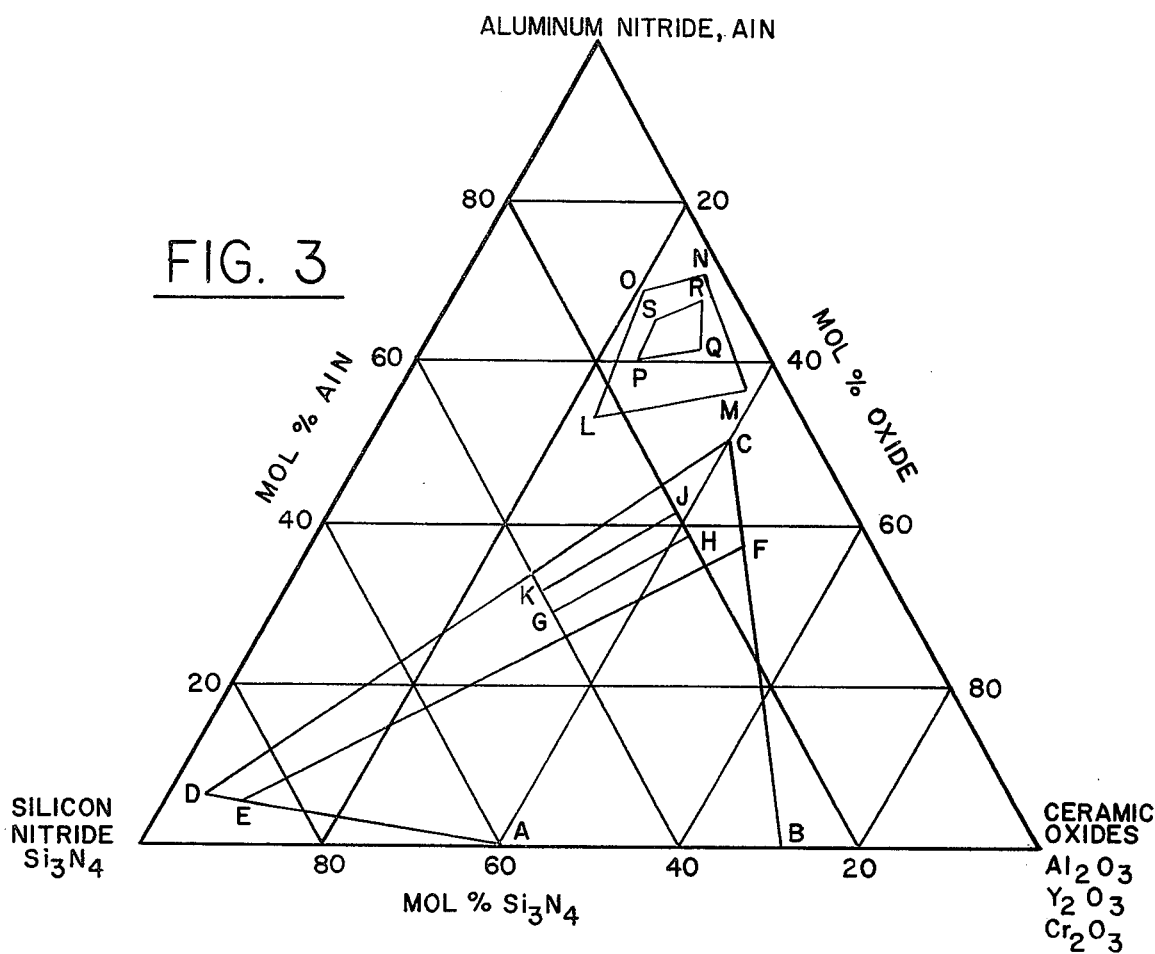
FIG. 3 is a pseudo ternary diagram of ceramic solid solutions used in making nozzles in accordance with the present invention.

The pseudo ternary diagram of FIG. 3 shows the composition of the ceramic solid solutions employed for producing the nozzles of the invention, and wherein the areas setting forth the general ranges of proportions, the preferred ranges of proportions, and the optimum ranges of proportions of silicon nitride, ceramic oxide, e.g. aluminum oxide, and aluminum nitride, in terms of mol percent of the respective components, is defined. Thus, the area of the ternary diagram bounded by the points A, B, C and D covers both the two component and three component ceramic solid solutions, in terms of mol proportions or percentages of the respective components of the solid solutions which can be employed for producing the nozzle compositions. It will be noted that the two component solid solutions of silicon nitride and ceramic oxide such as aluminum oxide, are defined by the line connecting points A and B, in terms of mol percent of these two components. The composition of the preferred three-component ceramic solid solutions in terms of mol proportions or percentages of the respective three components including also aluminum nitride, is defined by the area bounded by the points E, F, C and D. The composition of the optimum three component ceramic solid solutions for the invention is defined by the narrow rectangular area bounded by the points G, H, J and K, in terms of molar proportions or percentages of the components, which is within the area bounded by the preferred three-component ceramic solid solutions defined by the points E, F, C and D. It will be noted that both the preferred and the optimum ceramic solid solutions are encompassed within the broad general range of ceramic solid solutions defined by the area A, B, C, and D.

The compositions of the solid solutions at the points A, B, C, D, E, F, G, H, J and K, defining the boundaries of the above noted broad, preferred and optimum ranges of ceramic compositions, in terms of mol percent of the three components are set forth in Table I below.

TABLE I

| POINTS (mol %) | | | |
|---|---|---|---|
| A | B | C | D |

TABLE I-continued

|  |  | POINTS (mol %) | | | |
|---|---|---|---|---|---|
|  |  |  |  |  |  |
| Broad | AlN | 0 | 0 | 50 | 6 |
| Range | $Al_2O_3$ | 40 | 70 | 40 | 4 |
|  | $Si_3N_4$ | 60 | 30 | 10 | 90 |
|  |  | E | F | C | D |
| Preferred | AlN | 5 | 38 | 50 | 6 |
| Range | $Al_2O_3$ | 8 | 47 | 40 | 4 |
|  | $Si_3N_4$ | 87 | 15 | 10 | 90 |
|  |  | G | H | J | K |
| Optimum | AlN | 27 | 37 | 43 | 33 |
| Range | $Al_2O_3$ | 33 | 43 | 37 | 27 |
|  | $Si_3N_4$ | 40 | 20 | 20 | 40 |

It will be seen from the table above and the ternary diagram in the drawing, that the broad range of ceramic solid solutions encompasses the two-component solid solutions having a composition defined by line A, B, ranging from 30 to 60 mol % silicon nitride and from 40 to 70 mol % of the oxide, e.g., aluminum oxide, and 0 mol % of aluminum nitride. The three component preferred ceramic solid solutions defined by the area E, F, C and D encompass solid solutions having an amount of silicon nitride ranging from about 10 to about 90 mol %, an amount of ceramic oxide, e.g. aluminum oxide, ranging from about 4 to about 47 mol % and an amount of aluminum nitride ranging from about 5 to about 50 mol %. The optimum ceramic solid solution compositions defined by the area G, H, J and K encompass compositions having an amount of silicon nitride ranging from about 20 to about 40 mol %, an amount of oxide, e.g. aluminum oxide, ranging from about 27 to about 43 mol % and an amount of aluminum nitride ranging from about 27 to about 43 mol %.

In preferred practice with respect to the three-component compositions, aluminum nitride can be added to any solid solution of silicon nitride and the oxide such as aluminum oxide, up to the amount of such oxide present, or slightly more. Broadly, in such three-component compositions as defined above, there can be employed in the range from about 10 to about 90 mol % of the combination of the oxide, e.g. aluminum oxide, and aluminum nitride, preferably from about 40 to about 80 mol % of the combination of these two components, with amounts of the oxide and aluminum nitride throughout these ranges preferably being approximately equal. Although the proportions of aluminum nitride to the oxide such as aluminum oxide can range up to 60 mol % aluminum nitride and 40 mol % of the oxide, it is preferred not to employ more than about 50 mol % aluminum nitride in admixture with the oxide such as aluminum oxide.

Other preferred three component novel ceramic solid solutions for the invention in terms of mol percentages of the above noted three components, is defined by the area bounded by the points L, M, N and O in FIG. 3. The composition of optimum three component novel ceramic solid solutions of this type is defined by the area bounded by points P, Q, R and S, in terms of molar percentages of the components, and which is within the area bounded by the points L, M, N and O.

The compositions of the solid solutions at the points L, M, N, O, P, Q, R and S, defining the boundaries of the above noted preferred and optimum ranges of this series of ceramic solid solutions, in terms of mol percent of the three components is set forth in Table II below.

TABLE II

|  |  | POINTS (mol %) | | | |
|---|---|---|---|---|---|
|  |  | L | M | N | O |
| Preferred | AlN | 55 | 57 | 72 | 70 |
| Range | $Al_2O_3$ | 23 | 38 | 25 | 21 |
|  | $Si_3N_4$ | 22 | 5 | 3 | 9 |
|  |  | P | Q | R | S |
| Optimum | AlN | 60 | 62 | 68 | 65 |
| Range | $Al_2O_3$ | 26 | 31 | 28 | 24 |
|  | $Si_3N_4$ | 14 | 7 | 4 | 11 |

It will be seen from the above Table II and the ternary diagram in the drawing, that the series of three component ceramic solid solutions defined by the area L, M, N and O encompass solid solutions having an amount of silicon nitride ranging from about 3 to about 22 mol %, an amount of ceramic oxide, e.g. aluminum oxide, ranging from about 21 to about 38 mol % and an amount of aluminum nitride ranging from about 55 to about 70 mol %. The optimum ceramic solid solution compositions within the above preferred series of solid solutions and defined by the area P, Q, R and S encompass compositions having an amount of silicon nitride ranging from about 4 to about 14 mol %, an amount of oxide, e.g. aluminum oxide, ranging from about 24 to about 28 mol % and an amount of aluminum nitride ranging from about 60 to about 68 mol %.

As previously noted, the metal carbide particles which are dispersed in and coated with the ceramic solid solutions for producing the ceramic compositions of the invention, are preferably titanium carbide. However, particles or spheres of other high temperature resistant metal carbides can be employed, such as carbides of zirconium (Zr C), hafnium (Hf C), vanadium (VC), tantalum (Ta C), tungsten (WC) and silicon (Si C), and/or admixtures and/or solid solutions of these carbides, i.e., solid solutions of two or more carbides, such as Ta C+Ti C+Zr C, which will produce a higher hardness than a single carbide, as is usually the case. It has been found that ceramics of very high hardness can be obtained when included metal carbides are coated with and dispersed in solid solutions within the area defined by points L, M, N and O, and particularly within the area defined by points P, Q, R and S of the ternary diagram shown in FIG. 3.

The ceramic nozzles of the invention are produced by sintering the components in powder form in a mold at a temperature ranging from about 1,700° C. to about 2,000° C. under pressures ranging from about 1,000 psi to about 10,000 psi, preferably about 1,000 psi to about 5,000 psi. Such hot pressing followed by cooling under pressure results in a casting which has structural integrity as well as very high abrasion, erosion and oxidation resistance.

In carrying out the process for producing the nozzles with a metal carbide imbedded in the ceramic matrix, the metal carbide particles are first preferably sieved to obtain uniform particle size and eliminate fine particles less than about 0.001" in diameter, so as to obtain particles having a diameter generally ranging from about 0.001" to about 0.125", preferably from about 0.001" to about 0.010" in diameter.

The metal carbide particles are then preferably washed with soap or detergents and water, and rinsed. Biodegradable detergents free of phosphates are preferred, since they do not leave a static charge on the particles. An alkaline type detergent marketed as "Shaklee's Basic I" has been found effective, but any soap or detergent can be employed which will remove any grease or processing residue on the particles.

The washed metal carbide particles are preferably further washed in acetone and dried. However, any solvent can be used which evaporates clean from the particles, including alcohol and benzene. Solvents such as kerosene are not desirable since they tend to form a residue on the particles.

The mixture of particles of the ceramic components, e.g. aluminum oxide, silicon nitride and aluminum nitride, are sieved to eliminate coarse particles, preferably particles of a size greater than 1/10 of the size of the metal carbide particles. Thus, the size of the ceramic particles is preferably less than 1/10 the diameter of the metal carbide particles. Usually, the ceramic particles are of a size ranging from about 0.01 to about 0.05, the diameter of the metal particles or spheres.

The proportions of metal carbide particles to the ceramic powder mixture can vary. The greater the proportion of metal carbide particles to the ceramic powder forming the ceramic solid solution, the better the mechanical properties, particularly abrasion resistance of the resulting ceramic. However, sufficient ceramic mixture in relation to metal carbide powder is required to permit coating the metal carbide particles with the sintered ceramic solid solution so as to provide a uniform coating of the ceramic solid solution around the metal particles. Generally from about 5% to about 40%, preferably about 15% to about 30%, and more particularly 25%, by volume of the metal carbide, e.g. tatanium carbide particles or spheres, can be present in the total composition of metallic particles and ceramic powder.

In preferred practice, prior to mixing the metal carbide particles or powder with the ceramic mixture or powder, a binder is added to the metal carbide particles to aid in obtaining a more uniform coating of the ceramic powder on the metal carbide particles, and a more uniform dispersion of such particles within the ceramic matrix. Preferred binders for this purpose are any suitable wax, for example, paraffin wax, carnauba wax or beeswax. Preferably, the wax is applied warm, that is in melted condition, or it can be applied in a solvent solution, to uniformly coat the metal carbide particles with the binder. A suitable material is a solution of benzene saturated with beeswax. The coating of the metal carbide particles with the wax can be conveniently accomplished by warm ball milling the metal carbide particles or spheres with the melted wax or by placing the metal carbide particles in a solvent solution of the wax, e.g. benzene saturated with beeswax, decanting excess solution and drying the particles. Although not as desirable, alternative binders also can be employed, such as polyvinyl alcohol, aqueous soap solution, amyl acetate, butyl acetate, and nitrocellulose diluted with butyl alcohol.

Usually only sufficient binder is employed to obtain a thin layer or coating of the binder on the metal or metal alloy particles. The amount of binder generally employed to achieve this result can range from about 1% to about 10% by volume of the mixture of metal carbide particles, and binder.

If desired, a small amount of binder also can be added to the ceramic oxide powder, in addition to adding the binder to the metal carbide particles, as described above, prior to mixing such metal carbide particles with the ceramic oxide powder. However, usually the addition of the binder to the ceramic oxide powder is not necessary where, as in the preferred practice, the binder is added to the metal carbide particles.

The metal carbide particles, preferably coated with a binder as noted above, are then mixed with the ceramic components mixture under conditions to obtain a homogeneous mixture of metal carbide particles or spheres, uniformly coated with the ceramic powder. Preferably, the mixture is warmed slightly, e.g. at a temperature ranging from about 30° to about 60° C. to provide greater adherence of the coated metal particles to the ceramic powder. The mixture is processed as by tumbling to permit the ceramic particles to adhere to the wax coating on the metal carbide particles, thus coating the metal carbide particles with the ceramic particles. The tumbled mixture is then preferably sieved to break up any clusters of the metal carbide particles.

The resulting mixture is then subjected to sintering at high temperature and pressure in a mold to produce a high temperature, hard and shock resistant nozzle according to the invention. This is effectively accomplished by placing the mixture composed of the metal carbide particles distributed in and coated with the ceramic particles, in an inductively heated pressure mold for carrying out a high pressure, high temperature molding.

This molding operation is generally carried out at an elevated temperature which is just below the melting point of the metal carbide particles of the mixture, or the melting temperature of the molds into which the ceramic mixture is poured. The molds are coated with a suitable release agent, such as boron nitride (BN) to prevent bonding the nozzle to the mold. A graphite foil, commonly referred to as grafoil, can also be used between the graphite mold and the ceramic mixture to protect the mold and facilitate release of the part from the mold.

Time for sintering generally can range from about 10 to about 60 minutes. As previously noted, such sintering results in the formation of a ceramic matrix in which any metal carbide particles included are imbedded, resulting in the nozzle of the invention having highly improved properties of hardness, strength and resistance to abrasion and oxidation.

Nozzles molded in this manner have substantially the same proportions of ceramic materials and metal carbide particles, based on the original starting mixture of these components noted above. However, the density of the ceramic particles and metal carbide particles in the nozzles is increased because of the pressure molding operation.

The nozzles produced according to the invention have high hardness and strength, corresponding to a micro hardness of about 1,000 Kg/mm$^2$ to about 2,000 Kg/mm$^2$ and a tensile strength generally ranging from about 20,000 psi to about 150,000 psi. The nozzles also have high temperature resistance up to about 1,350° C. or higher, and high electrical insulation effectiveness. For example, a nozzle formed of titanium carbide particles and a ceramic solid solution comprised of the three components aluminum oxide, silicon nitride and aluminum nitride has an electrical insulation effectiveness in excess of 5 megohms-cms at room temperature.

The manner in which the nozzle of FIG. 1 is produced will now be described by way of example for all improved nozzles, and not by way of limitation. First a graphite core is made in the shape of desired passage through this nozzle. In this case, the funnel-like shape of the core may be easily turned in a lathe from a block of graphite, but it is preferably cast in that shape. The nozzle is then molded around the core.

Figure 4:
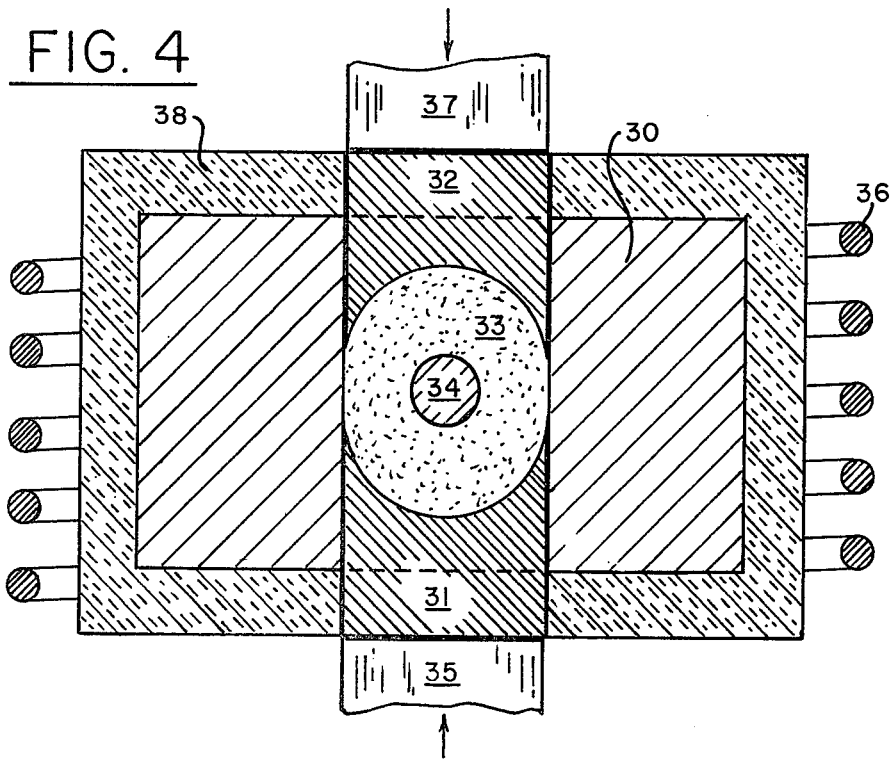
FIG. 4 is a transverse sectional view of an induction heated press for molding a nozzle of the configuration shown in FIG. 1.

To mold the nozzle around the core, the core is placed in a mold, the cavity of which is filled with powdered ceramic compositions, i.e., the metal carbide particles and/or powdered aluminum oxide, silicon nitride and aluminum nitride. This is illustrated in FIG. 4 which shows in a cross-sectional view a graphite block 30 and a graphite mold comprised of a lower half indicated by the numeral 31, and an upper half indicated by the numeral 32. The lower half is just partially inserted into the block 30, and the channel in the block above that lower half of the mold is partially filled with the powdered composition indicated by the reference numeral 33. The core is then placed in the channel and centered using centering pins passing into the channel through the ends of the block 30 to align the axis of the core. The core is indicated by the reference numeral 34. The channel is then filled with additional powdered composition to completely cover the core. A predetermined total quantity of powdered composition by weight is placed in the channel. Then the upper half of the mold is placed in the channel. The assembled block and mold is then set on a lower hydraulic ram 35 inside an induction coil 36. An upper hydraulic ram 37 is then brought into engagement with the upper half of the mold. Thermal insulation 38 is normally included between the graphite block and the coil, as well as across the top and bottom of the graphite block. The upper and lower halves of the mold penetrate this insulation and rest on the top and bottom rams, or platens, of a hydraulic press (not shown). The heating coil provides induction heating to a temperature as high as about 2,000° C. while the hydraulic press provides a pressure as high as about 10,000 psi. The high temperature and pressure is maintained for about 60 minutes. Then the temperature is reduced to near ambient temperature while the high pressure is maintained.

Clamping blocks 36 and 37 are not normally used. The assembly with powder in place is usually set on the lower hydraulic ram inside the induction coil and pressure applied as shown by the arrows on 38 and 39. Thermal insulation is normally included between the block (30) and the coil 35 as well as top and bottom. The blocks 38 and 39 penetrate this insulation and rest on the top and bottom rams or platens of the hydraulic press.

Such sintering of the powdered composition results in the formation of a ceramic solid solution matrix. If metal carbide particles were included in the composition, the result is a ceramic solid solution which coats and bonds the metal carbide particles to the matrix. In either case, an improved nozzle is provided having highly improved properties of hardness, strength and resistance to abrasion and oxidation.

Once the nozzle is removed from the mold, the core 34 is reamed out, and the nozzle is prepared for molding the casing by cleaning the outside surface. In the event the casing is to be made of plastic, the casing is formed around the nozzle by a known process commonly referred to as injection molding. In the event the casing is to be made of metal, the casing is formed around the nozzle by a known process commonly known as die casting. Both processes are essentially the same; only the materials and temperatures differ. Virtually any metal, such as iron, copper and aluminum, and alloys of metals, can be used to form the casing because their melting temperatures are significantly below the melting temperature of the ceramic material of the nozzle.

Figure 5:
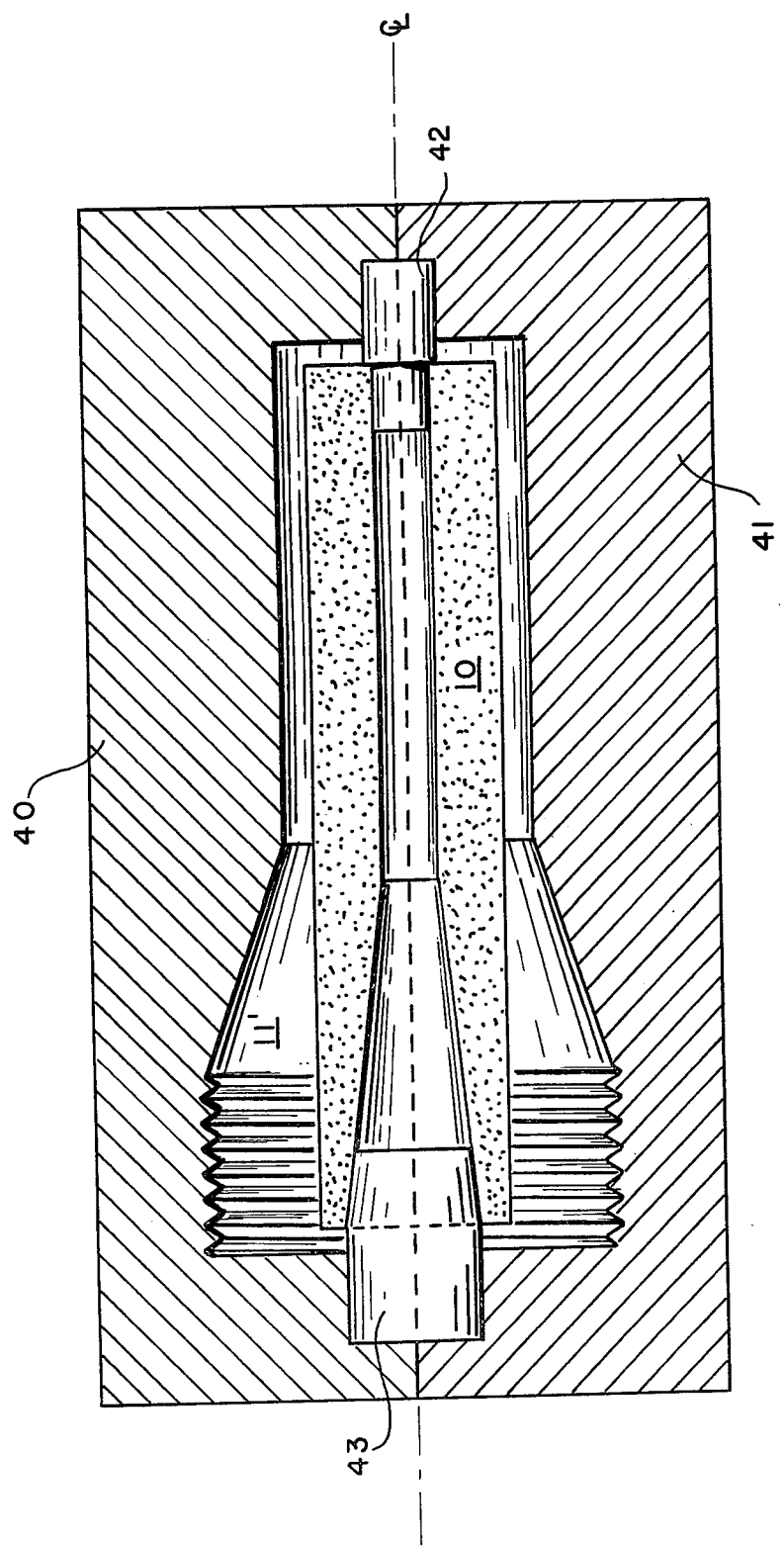
FIG. 5 is a longitudinal sectional view of a mold for forming a casing around the nozzle produced by the apparatus of FIG. 4 to provide an encased nozzle shown in FIG. 1.

FIG. 5 illustrates the manner in which a casing is molded around a nozzle. The nozzle is of the same configuration as that shown in FIG. 1, and therefore identified by the same reference numeral 10. The nozzle is placed in a mold for injection molding or die casting the casing around the nozzle. The mold is in two parts, 40 and 41. The parting line is conveniently selected to be along the centerline of the nozzle. With the top part 40 removed, and plugs 42 and 43 inserted into the nozzle, the nozzle is suspended in the bottom part 41. The top part 40 is then put in place over the plugs 42 and 43 to complete the mold. Melted plastic or metal is then injected through ports (not shown) to form the casing in a space 11' around the nozzle and plugs. Once the plastic or metal is allowed to cool, the top part 40 is removed. The nozzle and casing assembly is then removed from the lower part 41 with the plugs still in place. Once the plugs 42 and 43 are removed, the encased nozzle is ready for use.

The foregoing procedure for injection molding or die casting the casing around the nozzle assures a close and tight fit of the casing. The outer surface of the nozzle itself may be irregular as a result of its production by sintering, but the outer surface of the casing may be quite regular. The inside of the nozzle is also quite regular due to its having been reamed. In other configurations, it may be desirable to mold the casing separately, and to then simply slip the protective casing over the nozzle just prior to shipment or just prior to placing it in use.

What is claimed is:

1. A process for producing a high temperature, oxidation resistant, and high abrasion and erosion resistant body comprising the steps of:

forming a mixture consisting of powdered ceramic material and a carbide, said ceramic material comprising silicon nitride, aluminum nitride, and an oxide selected from the group consisting of aluminum oxide, yttrium oxide and chromium oxide, said carbide being present in an amount of about 25 percent by volume and being of an element selected from the group consisting of titanium, zirconium, hafnium, vanadium, tantalum, tungsten and silicon, and admixtures or carbides of these elements, and including solid solutions of carbides of these elements;

placing said mixture which consits of powdered ceramic material and said carbide in a high temperature pressing mold, said mold having a cavity of the shape desired for said body, and said cavity being filled with said mixture in sufficient quantity to produce a desired density in said body, and sintering said mixture while applying pressure to said mold to compress said mixture in the form of said cavity.

2. A process for producing a high temperature, oxidation resistant, and high abrasion and erosion resistant body comprising the steps of:

forming a mixture consisting of powdered ceramic material and a carbide, said ceramic material comprising silicon nitride, aluminum nitride, and an oxide selected from the group consisting of aluminum oxide, yttrium oxide and chromium oxide, with the molar proportions of the ingredients in the ceramic material being defined by the area bounded by points A, B, C, and D on the ternary diagram in the accompanying drawing, and said carbide being of an element selected from the group consisting of titanium, zirconium, hafnium, vanadium, tantalum, tungsten and silicon, and admixtures of carbides of these elements, and including solid solutions of carbides of these elements;

placing said mixture which consists of powdered ceramic material and said carbide in a high temperature pressing mold, said mold having a cavity of the shape desired for said body, and said cavity being filled with said mixture in sufficient quantity to produce a desired density in said body, and sintering said mixture while applying pressure to said mold to compress said mixture in the form of said cavity.

3. A process as defined in claim 2 wherein said carbide is included as a proportion of about 25% by volume.

4. A process for producing a high temperature, oxidation resistant, and high abrasion and erosion resistant body comprising the steps of:

forming a mixture consisting of powdered ceramic material and a carbide, said ceramic material comprising silicon nitride, aluminum nitride, and an oxide selected from the group consisting of aluminum oxide, yttrium oxide and chromium oxide, with the molar proportions of the ingredients in the ceramic material being defined by the area bounded by points E, F, C, and D on the ternary diagram in the accompanying drawing, and said carbide being of an element selected from the group consisting of titanium, zirconium, hafnium, vanadium, tantalum, tungsten, and silicon, and admixtures of carbides of these elements, and including solid solutions of carbides of these elements;

placing said mixture which consists of powdered ceramic material and said carbide in a high temperature pressing mold, said mold having a cavity of the shape desired for said body, and said cavity being filled with said mixture in sufficient quantity to produce a desired density in said body, and sintering said mixture while applying pressure to said mold to compress said mixture in the form of said cavity.

5. A process as defined in claim 4 wherein said carbide is included as a proportion of about 25% by volume.

6. A process for producing high temperature, oxidation resistant, and high abrasion and erosion resistant body comprising the steps of:

forming a mixture consisting of powdered ceramic material and a carbide, said ceramic material comprising silicon nitride, aluminum nitride, an an oxide selected from the group consisting of aluminum oxide, yttrium oxide, and chromium oxide, with the molar proportion of the ingredients in the ceramic material being defined by the area bounded by points G, H, J, and K on the ternary diagram in the accompanying drawings, and said carbide being of an element selected from the group consisting of titanium, zirconium, hafnium, vanadium, tantalum, tungsten and silicon, and admixtures of carbides of these elements, and including solid solutions of carbides of these elements;

placing said mixture which consists of powdered ceramic material and said carbide in a high temperature pressing mold, said mold having a cavity of the shape desired for said body, and said cavity being filled with said mixture in sufficient quantity to produce a desired density in said body, and sintering said mixture while applying pressure to said mold to compress said mixture in the form of said cavity.

7. A process as defined in claim 6 wherein said carbide is included as a proportion of about 25% by volume.

* * * * *